United States Patent
Hattersley et al.

(10) Patent No.: US 6,854,650 B2
(45) Date of Patent: Feb. 15, 2005

(54) MIRRORED SURFACE OPTICAL SYMBOL SCANNER

(75) Inventors: John R. Hattersley, Skaneateles, NY (US); Francis O. Blackwell, III, Auburn, NY (US)

(73) Assignee: Microscan Systems, Inc., Renton, WA (US)

( * ) Notice: Subject to any disclaimer, the term of this patent is extended or adjusted under 35 U.S.C. 154(b) by 0 days.

(21) Appl. No.: 10/120,284

(22) Filed: Apr. 10, 2002

(65) Prior Publication Data

US 2003/0192949 A1 Oct. 16, 2003

(51) Int. Cl.[7] .................................................. G06K 7/14
(52) U.S. Cl. ................... 235/454; 235/462.41; 235/435; 235/455; 235/462.06
(58) Field of Search ........................... 235/454, 462.41, 235/435, 455, 462.06, 462.05, 472, 470, 462.24, 462.32, 462.01; 359/17, 200, 211, 431, 438, 496, 514, 606, 625, 638, 678, 82; 382/127, 140; 250/566, 227.32, 227.31, 227.28, 227.29, 227.3, 216

(56) References Cited

U.S. PATENT DOCUMENTS

| | | | | |
|---|---|---|---|---|
| 3,812,374 A | * | 5/1974 | Tuhro | 250/568 |
| 4,743,773 A | * | 5/1988 | Katana et al. | 235/462.07 |
| 4,782,219 A | * | 11/1988 | Crater | 235/462.21 |
| 4,960,984 A | * | 10/1990 | Goldenfield et al. | 235/462.06 |
| 5,185,514 A | * | 2/1993 | Wike et al. | 235/375 |
| 5,406,060 A | * | 4/1995 | Gitin | 235/462.42 |
| 5,449,892 A | * | 9/1995 | Yamada | 235/462.42 |
| 5,585,616 A | * | 12/1996 | Roxby et al. | 235/462.06 |
| 5,600,116 A | * | 2/1997 | Seo et al. | 235/455 |
| 5,602,376 A | * | 2/1997 | Coleman et al. | 235/462.44 |
| 5,602,379 A | * | 2/1997 | Uchimura et al. | 235/462.11 |
| 5,945,661 A | * | 8/1999 | Nukui et al. | 235/462.45 |
| 6,098,887 A | | 8/2000 | Figarella et al. | 235/472.01 |
| 6,105,869 A | * | 8/2000 | Scharf et al. | 235/454 |
| 6,202,929 B1 | * | 3/2001 | Verschuur et al. | 235/462.25 |
| 6,323,503 B1 | | 11/2001 | Hecht | 250/566 |
| 6,595,422 B1 | * | 7/2003 | Doljack | 235/462.42 |

FOREIGN PATENT DOCUMENTS

JP 06237376 A * 8/1994 ............ H04N/1/40

* cited by examiner

*Primary Examiner*—Karl D. Frech
*Assistant Examiner*—Daniel Walsh
(74) *Attorney, Agent, or Firm*—Blakely Sokoloff Taylor & Zafman LLP

(57) ABSTRACT

An optical symbol scanner assembly has an illumination attachment to facilitate detection and decoding bar code symbols that are printed or formed on mirror-finish surfaces. A hand-held scanner has an array of LEDs or laser diodes on its distal face that produces light to illuminate the symbol. The illumination attachment is mounted on the distal face of the scanner device. At a distal end of the illumination attachment is a diffusion-treated surface such that the illumination leaving the attachment appears as a bar or zone of diffuse light. This is reflected off the bar code, so that the mirror-finish areas appear as the bright or high portions of the symbol and the diffuse areas thereof appear as the dark or low portions. The attachment may be in the form of a block or plate of a clear plastic, or may be formed as a prism.

15 Claims, 3 Drawing Sheets

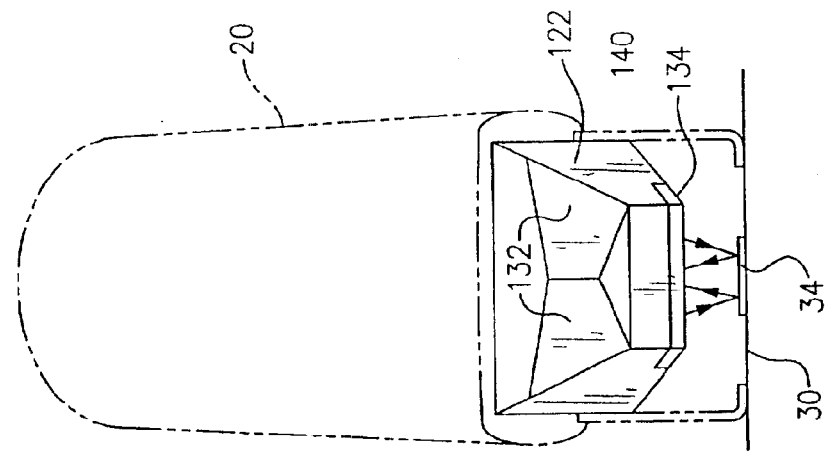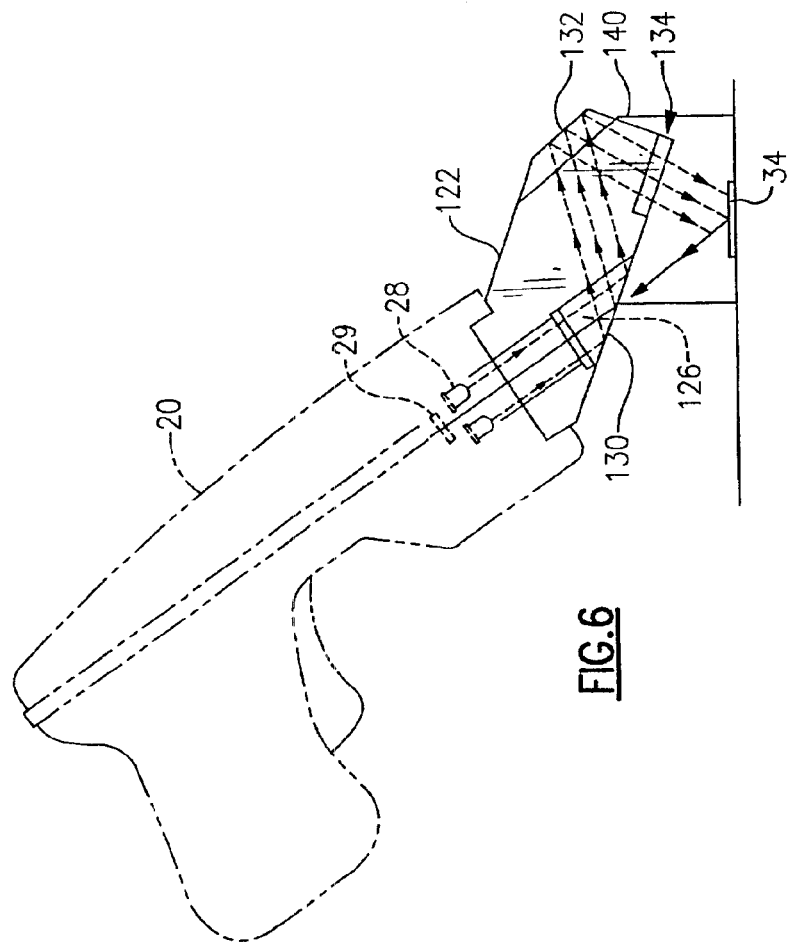

MIRRORED SURFACE OPTICAL SYMBOL SCANNER

BACKGROUND OF THE INVENTION

This invention is directed to the scanning devices, such as bar code scanners, and is more particularly concerned with an arrangement for reading optical symbols, e.g., small linear or two-dimensional bar code symbols that are directly marked on parts or components. Such bar code symbols may be used to identify the part number and serial number of an electronic microcircuit devices, communications cables and connectors, diesel engine ignitors, as well as many other products. The invention is more particularly concerned with a device that is combined with an illuminator for shining light on the bar code symbol or other symbol which is marked onto a specularly reflective, i.e., mirrored surface.

Within the past several years, two dimension bar code systems have begun to be employed on small articles so that the article can be tracked thought a manufacturing process. For example, two-dimensional bar code symbols are inscribed onto electronic parts, e.g. as miniature etched or printed part numbers and serial numbers on microprocessors, other integrated circuits, and printed circuit boards. Because of the high information density of the 2D symbols, these can carry the part number, part serial number, and manufacturing history of the part, such as the place and date of manufacture, and all in a square that may typically be only three millimeters on a side. The symbols can be screen printed, ink jet printed, or laser-etched directly onto the top surface or the case of the device or part. However, in order to read the bar code easily on the first attempt, the conventional wisdom is that the illumination should impinge on the bar code symbol in a way that fully illuminates it but avoids flare from specular reflection.

Because of the small size of 2-D bar code symbols, the symbols can be difficult for the scanner to interpret where the lighting is weak or if the contrast is too low. For example, Datamatrix™ bar code, which has been selected as the EIA (Electronics Industry Association) standard for small parts marking, is in the form of a matrix of bars about three millimeters on a side. These are inscribed by laser etching onto the plastic or ceramic housing or package for the electronic module, or can be printed by an ink jet technique. In either case, if the lighting is such that the scanner picks up specular reflection, the bar code symbol typically produces a wash out, and may take several attempts to obtain a valid reading. Consequently, current bar code scanners have had some difficulty in obtaining bar code data in industrial processes where the small parts are to be identified from these very small bar code symbols.

In addition to this, many times it is necessary to imprint the bar coded information directly onto a flat shiny surface, e.g., the surface of a semiconductor chip, the polished steel shaft of an automotive part, or a plated surface of industrial device, such as a nuclear fuel rod, a oil-drilling bit, or any of many other parts or devices. In these cases, the light typically is incident at a low angle and the scanner is held with its optic axis perpendicular to the specular surface. This directs most of the light that is incident on the mirrored surface so it is reflected away from the scanner, such that these highly reflective areas appear as a relatively dark areas on the image of the bar code symbol. The light impinging on the printed or etched portions of the symbol are diffused, i.e., scattered in all directions, so that some of the light is visible in the scanner, and appears as the light portions of the symbol. Because only a small portion of the diffused light reaches the scanner, the symbol is made white, i.e., printed in white ink, if possible, for maximum reflectance. However, it is not always possible to use make the symbol white or use a highly reflective diffuse coating, especially when the bar code symbol is etched, engraved, or peened directly onto the mirrored surface of a component or part. Consequently, these direct marked symbols have been difficult to read for imaging bar code scanners. Of course the situation would also be the same with bar coded symbols in which a the symbol is formed of a mirror-finish material printed onto a diffusive surface.

OBJECTS AND SUMMARY OF THE INVENTION

Accordingly, it is an object of this invention to provide an improved illumination arrangement for a optical symbol scanning device that avoids the drawbacks of the prior art.

It is another object to provide bar code scanner and diffuse illuminator arrangement that permits rapid and accurate reading of symbols that have been printed or etched onto a shiny (mirror-finish) surface.

It is a further object to provide a hand-held scanner and illuminator that permits a user to read and accurately decode a symbol that has been directly printed on an article.

It is still a further object to provide an illuminator for a hand-held 2-D bar code scanner that can be incorporated into the working or distal face of the scanner and which provides a bar, i.e., a wide zone of diffuse illumination, so that the scanner picks up a reflected image of the bar of diffuse illumination in which the bar code symbol appears as dark regions or areas.

According to one aspect of this invention, a scanner assembly is configured for detecting and decoding a small-scale two-dimensional optical symbol, such as a 2-D bar code symbol, lying on a surface of an electronic module or other article. The scanner assembly can be a hand-held contact device. The optical symbol scanner assembly here is adapted for detecting and decoding a bar code symbol or other visible symbol that lies on the surface of an article, with the symbol comprising a pattern of areas of a non-mirror finish on a mirror-finish surface. The specular or mirror finish can be the bars with the diffuse areas being the spaces between the bars, or vise versa.

The scanner device has a distal face on which is positioned light-generating means, e.g., an array of LEDs, for producing illumination to fall on the symbol, and focusing means for focusing an image of said symbol on an imager device positioned proximally of the focusing means in said scanner device. The focusing means defines an optic axis, such that the symbol is to be placed across the optic axis when it is read. A diffuse illuminator is adapted to be mounted on the distal face of said scanner device, and has an optical passageway whose optic axis is aligned with the optic axis of said scanning device. There is at least one light conductor member that has a proximal face to receive illumination from the scanner's light-generating means and a diffuse distal face for creating a bar of diffuse illumination. With this illuminator, when the scanner device is oriented at a predetermined angle with respect to the surface of said article, the bar of diffuse illumination impinges on said symbol such that the scanner device views a reflected image of the diffuse bar that is reflected in said mirror surface. The non-mirror finish areas thus create a pattern of dark, low-illumination areas in the reflected image.

In one preferred embodiment, the diffuse illuminator can be in the form of a block or plate of a transparent material (e.g., a transparent plastic) having a diffusion treatment at its distal face. The optical passageway can be an opening through the diffuse illuminator along the optic axis.

In another preferred embodiment, the diffuse illuminator has a light conductor in the form of a transparent prism, e.g., of clear acrylic, having a one or preferably more than one reflective surface for deflecting illumination at a predetermined angle relative to the optic axis. A diffuser member is positioned on the prism after the last of the reflective surfaces so that the light exiting the illuminator creates a bar of diffuse illumination. In that case, the passageway includes an opening in said prism that permitting the reflected image of the symbol to pass undeflected back through said prism. In the disclosed embodiment, the prism has a first angulated surface that crosses the optic axis, with a first reflective surface on a portion of said first angulated surface, and a second reflective surface, such that the light from said light generating means is reflected first by the first reflecting surface, and then is reflected by the second reflecting surface to the diffuser member, where the light exits the prism.

In this invention, illumination is not limited only to light in the visible spectrum, but may be infrared or other wavelengths.

The above and many other objects, features, and advantages of this invention will present themselves to persons skilled in this art from the ensuing description of preferred embodiments of this invention, as described with reference to the accompanying Drawing.

BRIEF DESCRIPTION OF THE DRAWING

FIGS. 6 and 7 are a side view and distal end view of a scanner according to another embodiment.

DETAILED DESCRIPTION OF THE PREFERRED EMBODIMENT(S)

Figure 1:
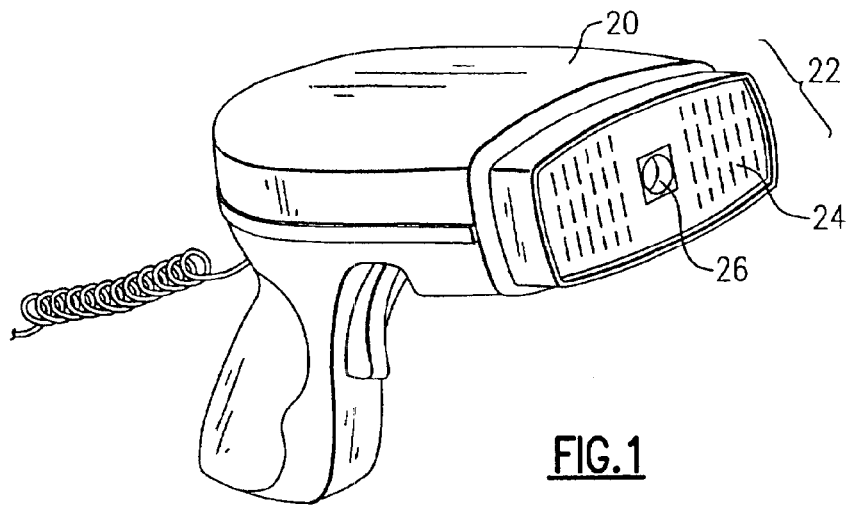
FIG. 1 is a perspective view of a bar code scanner with a diffuse illuminator, according to on embodiment of this invention.

With reference to the Drawing, and initially to FIG. 1, a hand-held data inputting scanner 20, i.e., a hand-held two-dimensional bar code scanner, and an illumination attachment 22 according to an embodiment of this invention is mounted on the front or distal end of the scanner 20. The combination scanner and illumination attachment of this embodiment is designed to read a bar code symbol that is printed, etched, or otherwise formed on a highly reflective mirror surface. The illuminator attachment 22 is in the form of a block or slab of a clear acrylic, with a distal side that receives light from light generating elements on the scanner 20, and a diffuse surface 24, i.e., "frosted", that scatters or diffuses the light that exits the illuminator attachment. A clear or open passageway 26 is provided in the center of the illuminator attachment 22 along the optic axis of the scanner 20 to provide a path or passageway for viewing and imaging bar code symbols.

Figure 2A:
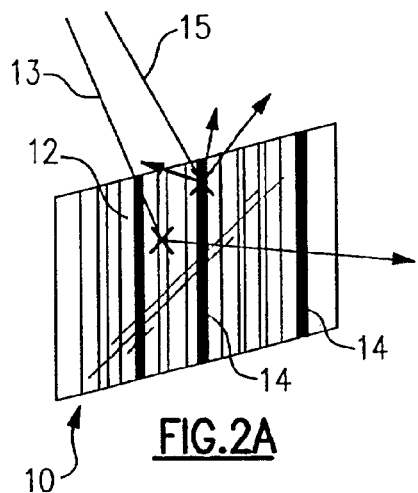
FIG. 2A is a perspective view of a bar code symbol having mirror finish elements and diffuse elements.
Figure 2B:
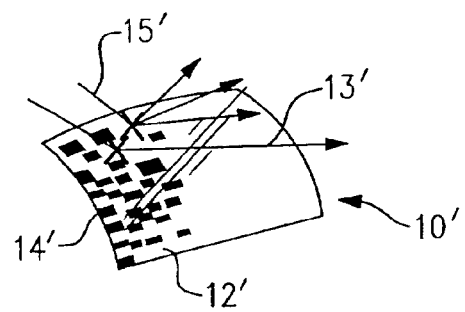
FIG. 2B is a perspective view of a two-dimensional bar code symbol having mirror finish elements and diffuse elements.

As shown in FIG. 2A, a linear or one-dimensional symbol 10 may be formed as a pattern of parallel alternating dark and light bars of different widths. In this case, the symbol 10 is formed on a mirror-finish surface 12, and light that lands on this surface 12 is reflected specularly, i.e., so that the light remains in a reflected beam 13, as illustrated here. The symbol 10 is printed with an ink that is diffusely reflective, e.g., flat with white or colored pigments, forming diffusive (i.e., non-mirror-finish) bars 14. The light 15 that lands on these bars 14 is diffused or scattered, and much less of this light continues in the same direction as the specularly reflected light 13. A two-dimensional bar code symbol 10' is shown in FIG. 2B, with a base surface 12' that is mirror-finish, and a pattern of areas 14' of diffusive ink or surface treatment. As with the FIG. 2A symbol 12, any light 13' landing on the mirror-finish surface 12' will be specularly reflected, and any light 15' landing on the areas 14' will be scattered or diffusely reflected.

Figure 3:
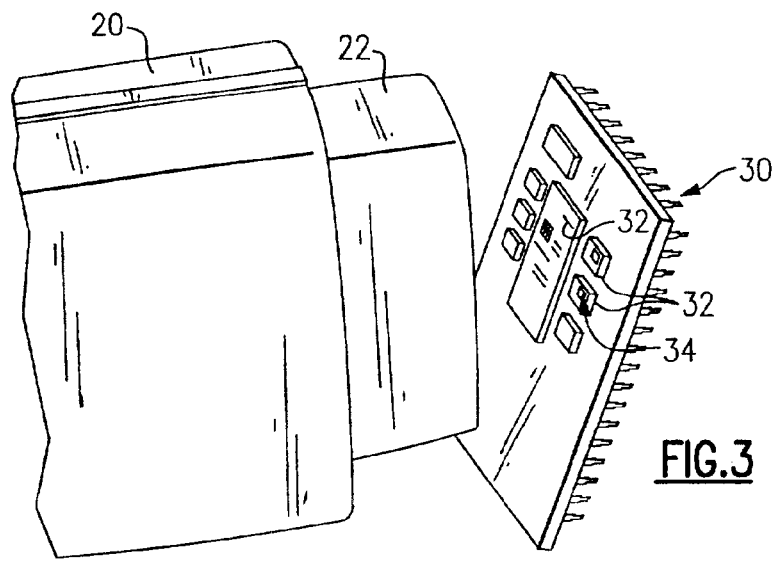
FIG. 3 is a perspective view of the scanner of the first embodiment situated at a predetermined angle relative to an article that carries a mirror-finish bar coded symbol, for explaining the principles of this invention.

As illustrated in FIG. 3, the scanner 20 with its illuminator attachment 22 can be positioned at an angle to a bar-coded article to view and read the symbol or symbols printed on it, where the symbols are formed directly on a mirror-finish surface of the article. In this example, an electronics module 30 can have one or more microcircuit chips 32 mounted on it, each with a small, two-dimensional bar code symbol 34 carried on an upper surface. In other examples, the bar-coded articles may be automotive or aviation parts, or articles for any of a wide variety of commercial or industrial uses. The bar code symbol 34 can be a matrix symbology, such as DataMatrix, or alternatively, Maxicode, PDF41 7, Aztec, or another protocol. Alternatively, a linear bar code, full-size to ultra-small, can be used, such as Codabar, UPC, or another symbology. The bar code symbol makes it possible to read automatically the part number, part serial number, manufacturing history, and other important data about the microcircuit 32 or of the module 30 during various manufacturing stages, or later on during the product life, e.g., for warranty purposes. However, because of the small size of the bar code symbol 12, the same is often applied directly onto the surface of the module 10 for example by an ink jet printing technique. Low contrast and specular reflection of the illumination has previously made it very difficult to read the symbol. However, if the optical axis of the scanner 20 is held at an angle to the bar code symbol 34, the diffuse light from the diffusion surface 24 forms a bar of diffuse light that is seen as a reflected image in the mirror-finish surface. The diffuse areas (of ink, paint, etching, etc) which scatter the light appear as dark areas of the bar code symbol, and the pattern of alternate light and dark areas is easily seen by the scanner to produce a good read.

Figure 4:
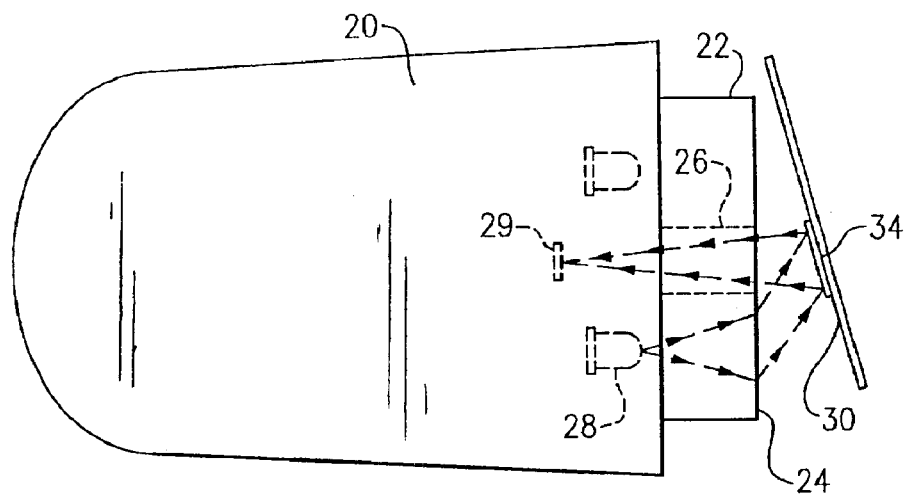
FIG. 4 is a top view of the scanner of this embodiment.
Figure 5:
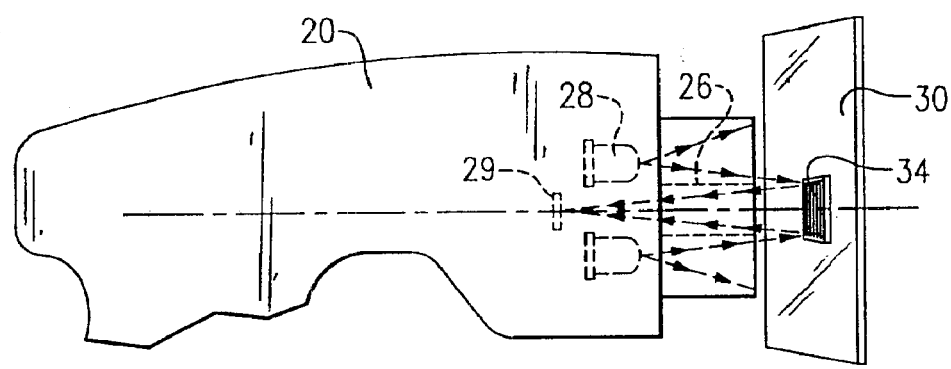
FIG. 5 is a side elevational view of this embodiment.

FIGS. 4 and 5 illustrate details of the scanner and illumination attachment of this embodiment, with the attachment 22 fitted into the distal face of the scanner 20. The attachment 22 is clear plastic with its front diffusing surface 24 and the passageway 26 in the form of a central opening at the optical axis of the scanner. The scanner 20 has an array of LEDs 28 that generate light of an appropriate wavelength. Within the scanner and positioned on its optical axis is a an electronic imager 29, e.g., a CCD or CID or other solid state device, with ancillary circuitry for processing (not shown). Also, there are focussing optics for forming an image of the bar code symbol onto the imager 29, but these are not shown here.

In this example, the scanner 20 is held so that it is at an angle of 15 to 20 degrees from normal with respect to the electronics module 30. The diffuse illumination from the diffusion surface 24 is reflected from the mirror-finish surface at the area of the bar code symbol 34, and is reflected directly along the optic axis of the scanner and through the passageway 26. The printed or etched diffuse or non-mirror-finish portions of the bar code symbol 34 will then appear as dark bars or dark areas of the reflected image. This produces an acceptable high contrast between the light and dark areas of the symbol, so that there are consistent good reads.

Another embodiment is shown in FIGS. 6 and 7, in which an illuminator attachment 122 in the form of a prism is attached onto the front or distal face of the hand held scanner 20. The illuminator attachment 122 provides a bar or similar area of diffuse illumination at a position beyond that of the bar code symbol 34. A passageway 126, i.e., a tubular opening, extends along the optic axis of the scanner, and crosses an angled surface 130 of the prism. This surface 130 reflects illumination from the array of LEDs 28 and directs the light across the prism toward a pair of roof surfaces 132. These surfaces reflect the light downward toward a flat diffusion plate 134 and the light exits this plate as a bar of diffuse, even illumination. This light reflects off the mirror-finish surface of the module 30 where the bar code symbol 34 is printed or otherwise formed, so that the scanner 20 views a reflected image of the diffusion plate 134, or of a portion of the plate 134, reflected in the bar code symbol. This produces the visible image of the bar code symbol with the specularly reflected light forming the high or bright areas and the diffusely reflected light forming the low or dark areas.

As can also be seen in FIGS. 6 and 7, the prism shape of the illuminator attachment is tapered towards its forward or distal end, and this helps to concentrate the illumination that reaches the diffusion plate 134. An optional removable guide foot 140 assists the user in proper placement of the illuminator attachment for viewing the bar code symbol.

While the invention has been described and illustrated in respect to a few selected preferred embodiments, it should be appreciated that the invention is not limited only to those precise embodiments. Rather, many modifications and variations would present themselves to those of skill in the art without departing from the scope and spirit of this invention, as defined in the appended claims.

We claim:

1. An optical symbol scanner assembly for detecting and decoding a symbol lying on a surface of an article, the symbol comprising a pattern of areas of a non-mirror finish on a mirror-finish surface, the assembly comprising:

a scanner device having a distal face on which is positioned light-generating means for producing illumination to fall on said symbol, and focusing means for focusing an image of said symbol on an imager device positioned proximally thereof in said scanner device, said focusing means defining an optic axis; and a diffuse illuminator mounted on the distal face of said scanner device, including an optical passageway having an optic axis aligned with the optic axis of said scanning device, and at least one light conduit having a proximal face to receive illumination from said light-generating means and carrying illumination out to a bar-shaped diffuse distal face with the light conduit having a sufficient distance between the proximal and distal faces so that the diffuse distal face of the illuminator appears as an elongated uniform bar of substantially even diffuse illumination, such that when the seamier device is oriented at a predetermined angle with respect to the surface of said article, the light from the bar of diffuse illumination impinges on said symbol such that the scanner device views a reflected image of the uniform diffuse bar reflected in said mirror surface with said non-mirror finish areas thereof creating dark, low-illumination areas in said reflected image.

2. An optical symbol scanner assembly according to claim 1 wherein said diffuse illuminator includes a block of a clear transparent material having bar-shaped distal face, with a diffusion treatment at its distal face.

3. An optical symbol scanner assembly according to claim 2 wherein said passageway includes an opening through said diffuse illuminator and through said at least one light conduit along said optic axis.

4. An optical symbol scanner assembly according to claim 1 wherein each said light conduit is in the form of a transparent prism having at least one deflective surface therein for deflecting said illumination at a predetermined angle relative to said optic axis, and a diffuser member positioned after said deflective surface of said prism for creating said bar of diffuse illumination.

5. An optical symbol scanner assembly for detecting and decoding a symbol lying on a surface of an article, the symbol comprising a pattern of areas of a non-mirror finish on a mirror-finish surface, the assembly comprising:

a seamier device having a distal face on which is positioned light-generating means for producing illumination to fall on said symbol, and focusing means for focusing an image of said symbol on an imager device positioned proximally thereof in said scanner device, said focusing means defining an optic axis; and a diffuse illuminator mounted on the distal face of said scanner device, including an optical passageway having an optic axis aligned with the optic axis of said scanning device, and at least one light conductor member having a proximal face to receive illumination from said light-generating means and a diffuse distal face that appears as a uniform bar of diffuse illumination, such that when the scanner device is oriented at a predetermined angle with respect to the surface of said article, the light from the bar of diffuse illumination impinges on said symbol such that the scanner device views a reflected image of the diffuse bar reflected in said mirror surface with said non-mirror finish areas thereof creating dark, low-illumination areas in said reflected image, wherein each said light conductor is in the form of a transparent prism having a proximal face adjacent said light-generating means and a distal face from which the light exits, and at least one light-bending surface therein for deflecting said illumination at an angle relative to said optic axis, and a diffuser member positioned after said light-bending surface of said prism whereby the diffuser member appears as said bar of diffuse uniform illumination, and wherein the said passageway includes an opening in said prism permitting the reflected image of said diffuser member with said symbol imposed therein to pass undeflected back through said prism.

6. An optical symbol scanner assembly according to claim 5 wherein said prism has a first angulated surface that crosses said optic axis, with the at least one light-bending surface including a first deflective surface on a portion of said first angulated surface, and a second deflective surface, such that the light from said light generating means is deflected by said first deflective surface, and then by said second deflective surface to said diffuser member.

7. An optical symbol scanner assembly according to claim 4 wherein said prism member is formed of a clear acrylic.

8. An optical symbol scanner assembly for detecting and decoding a two-dimensional optical symbol lying on a surface of an article, comprising a housing;

a scanner device within said housing including an imager device and focusing means for focusing an image of said optical symbol on said imager device, said focusing means defining an optic axis; and a diffuse illuminator mounted in said housing along said optic axis and including an optical passageway having an optic axis aligned with the optic axis of said scanning device, having at least one light-generating means and having a light conduit with a proximal side facing said light-generating means and adjacent thereto, end a bar-shaped diffuse distal face on a distal side of the light conduit, with the light conduit carrying light from said light-generating means out to the diffuse distal face so that diffuse light exits the diffuse distal face, and the diffuse distal face appears as a bar of uniform diffuse illumination, such that when the scanner device is oriented at a predetermined angle with respect to the surface of said article, the bar of diffuse illumination impinges on said symbol such that the scanner device views a specular reflected image of the diffuse bar reflected from said surface of said article; with said selected areas of said two-dimensional symbol creating dark, low-illumination areas in said reflected image.

9. An optical symbol scanner assembly according to claim 8 wherein said light-generating means includes an array of LEDs mounted in said housing and spaced from said optic axis.

10. An optical symbol scanner assembly according to claim 1 further comprising at least one guide foot at the distal face of the illuminator for assisting in positioning the illuminator at a predetermined angle for viewing a specular image of the two-dimensional symbol.

11. An optical symbol scanner assembly according to claim 10, wherein said predetermined angle is about 15 to 20 degrees from the normal with respect to said two-dimensional symbol.

12. An optical symbol scanner assembly according to claim 5, wherein said optical passageway includes a tubular opening that crosses an angled surface of said transparent prism.

13. An optical symbol scanner according to claim 1, wherein said diffuse illuminator is positioned at least primarily to one side of said optic axis.

14. An optical symbol scanner according to claim 5, wherein said diffuser member is positioned at least primarily to one side only of said passageway.

15. An optical symbol scanner according to claim 8, wherein the diffuse distal face of said diffuse illuminator is positioned at least primarily to one side only of said optic axis.

* * * * *